United States Patent
Yamasaki et al.

[11] Patent Number: 5,989,693
[45] Date of Patent: Nov. 23, 1999

[54] FLUORINE-CONTAINING ABRASION-RESISTANT OPTICAL THIN FILM DEVICES

[75] Inventors: Nancy L. S. Yamasaki; Lauren R. Wendt; Joseph H. Apfel, all of Santa Rosa, Calif.

[73] Assignee: Optical Coating Laboratory, Inc., Santa Rosa, Calif.

[21] Appl. No.: 08/828,862

[22] Filed: Mar. 31, 1997

Related U.S. Application Data

[63] Continuation of application No. 08/479,706, Jun. 7, 1995, abandoned, which is a continuation-in-part of application No. 08/379,709, Jan. 26, 1995, abandoned.

[51] Int. Cl.[6] .............................. G02B 1/10; B32B 9/00
[52] U.S. Cl. ..................... 428/216; 359/580; 359/582; 428/408; 428/428; 428/336; 428/698
[58] Field of Search .................................. 428/408, 216, 428/336, 428, 698; 359/580, 528

[56] References Cited

U.S. PATENT DOCUMENTS

| | | | |
|---|---|---|---|
| 4,504,519 | 3/1985 | Zelez | 428/408 |
| 4,597,844 | 7/1986 | Hiraki et al. | 428/408 |
| 4,647,494 | 3/1987 | Meyerson et al. | 428/216 |
| 4,668,365 | 5/1987 | Foster et al. | 428/698 |
| 4,777,090 | 10/1988 | Ovshinsky et al. | 428/408 |
| 4,783,361 | 11/1988 | Ovshinsky et al. | 428/217 |
| 4,839,244 | 6/1989 | Tsukamoto | 428/500 |
| 4,851,095 | 7/1989 | Scobey et al. | 204/192 |
| 5,135,808 | 8/1992 | Kimock et al. | 428/336 |
| 5,234,748 | 8/1993 | Demnyont et al. | 428/216 |
| 5,238,705 | 8/1993 | Hayashi et al. | 427/249 |

(List continued on next page.)

FOREIGN PATENT DOCUMENTS 0499287  8/1992  European Pat. Off. .

OTHER PUBLICATIONS

Bubenzer and Dischler, Optical Properties of Hydrogenated Amorphous Carbon (a–C:H) —a Hard Coating for IR–Optical Elements, Laser Induced Damage in Optical Materials: 1981, pp. 477–481, Proceedings of National Bureau of Standards Symposium, Nov. 1981.

Stein and Aisenberg, Studies of Diamond–Like Carbon Coatings for Protection of Optical Components, Laser Induced Damage in Optical Materials: 1981, pp. 482–488, Proceedings of the National Bureau of Standards Symposium, Nov. 1981.

(List continued on next page.)

Primary Examiner—Archene Turner
Attorney, Agent, or Firm—Workman, Nydegger & Seeley

[57] ABSTRACT

The optical properties (absorption, reflection, transmittance, transparency) and physical attributes (hardness, friction, durability, etc.) of metal oxides, nitrides, or films that combine these materials can be modified by adding fluorine to the deposition mixture. The extent of change in properties depends on the amount of fluorine incorporated. Contrary to previous information, the presence of fluorine does not prevent adhesion of overlayers such as hard carbon, hydrogenated carbon, or diamond-like carbon. Considering for example massive silicon oxynitride hardcoat layers which are part of wear resistant composite windows for visible spectral applications, preferably fluorine is incorporated in a relatively very thin surface-adjacent region or layer of the hardcoat on the side thereof on which a carbonaceous layer such as DLC is formed. As a result, the index of refraction of the very thin surface region is reduced, the surface region can be used as an effective interference layer, absorption is reduced, reflectance is reduced, transmittance and transparency are improved, and durability is maintained. These fluorine-modified films can be used in many optical designs, including windows or wear resistant coating for laser scanner windows and ophthalmic applications.

16 Claims, 8 Drawing Sheets

U.S. PATENT DOCUMENTS

| | | | |
|---|---|---|---|
| 5,268,217 | 12/1993 | Kimock et al. | 428/216 |
| 5,378,527 | 1/1995 | Nakanishi et al. | 428/216 |
| 5,631,087 | 5/1997 | Fukuda et al. | 428/408 |

OTHER PUBLICATIONS

Moravec T., The Disposition of Diamondlike Carbon Thin Films on $CaF_2$, Laser Induced Damage In Optical Materials: 1981, pp. 489–492, Proceedings of National Bureau of Standards Symposium, Nov. 1981.

Bubenzer et al., Hard Caron Coatings for IR–Optical Components, Proceedings of DARPA Workshop on Diamond–Like Carbon Coatings, pp. 33–47, Albuquerque, NM, Apr. 1982.

Hendry et al., Hard Carbon for Environmental Protection of FLIR Optics, Proceedings of DARPA Workshop on Diamond–Like Carbon Coatings, pp. 100–107, Albuquerque, NM, April 1982.

Smith, F.W., Electrical and Optical Properties of Diamond–Like, Amorphous Carbon Films, Proceedings of DARPA Workshop on Diamond–Like Carbon Coatings, pp. 139–151, Albuquerque, NM, Apr. 1982.

Macleod H.A., Diamondlike Carbon Films in Optical Coatings, Proceedings of DARPA Workshop on Diamond–Like Carbon Coatings, pp. 205–208, Albuquerque, NM, Apr. 1982.

FLUORINE-CONTAINING ABRASION-RESISTANT OPTICAL THIN FILM DEVICES

This is a continuation of application Ser. No. 08/479,706, filed Jun. 07, 1995 now abandoned which is a continuation-in-part application of application Ser. No. 08/379,709, filed Jan. 26, 1995, now abandoned.

I. BACKGROUND OF THE INVENTION

A. Field of the Invention

The present invention relates to wear or abrasion resistant windows or composites which include optical thin films and have visible spectral applications and, in particular, to such windows which include carbonaceous films.

As used here in reference to the present invention, the term wear or abrasion resistant window or abrasion resistant glass window, refers to a window which is used in applications such as laser bar code scanners and which is transparent over applicable portions of the visible spectrum. The wear resistant window is a composite which comprises a transparent substrate of material such as glass or silicon oxide and one or more thin film coatings which enhance physical and/or optical properties of the substrate such as durability and transparency for visible radiation. The word "window" is used here to denote the substrate on which the thin film coating(s) are formed and as a shorthand reference to the overall coated substrate composite. Also, "index" is used as shorthand for index of refraction.

B. Description of the Related Technology

1. Non-Fluorine-Containing Wear Resistant Glass Window

Wear resistant windows are used in applications such as laser bar-code scanners in point-of-sale (POS) equipment. In some applications such as in the POS equipment used in groceries and convenience stores, wear resistant windows are subjected to severe mechanical abrasion by moving bottles, cans, and other merchandise. Glass windows which are or include ordinary glass typically are quickly scratched beyond usefulness by short periods of use in such an environments. Although crystalline or polycrystalline aluminum oxide (sapphire) is superior in that it is much harder than glass, sapphire is unsuitable for most commercial applications because it is extremely expensive.

High transparency is essential in laser bar-code scanner windows. Ordinary glass has a refractive index of 1.52 and a transmittance of about 92% for the red laser wavelengths which are of primary interest. Sapphire has an index of refraction of about 1.67 and a transmittance of about 88% over the same range of wavelengths. Coated wear resistant windows such as the above product are slightly absorbing, and are less transparent than uncoated glass or uncoated sapphire. Higher transmission is desirable in some cases in order to consistently meet the transmittance specifications. For example, an exemplary minimum transmittance for laser bar code scanner windows is 78% over the 600–650 nm (nanometers) portion of the visible spectrum. Under continuous use (i.e., subjected to mechanical abrasion), minimum transmittance must be maintained for scanner windows to avoid misreads. Therefore, one must balance transparency and resistance to mechanical abrasion in the selection of materials or coatings, to obtain a fully functional product.

Wear resistant window glass coatings are also described in U.S. Pat. Nos. 5,135,808 and 5,268,217. These patents teach that DLC (diamond-like carbon) will not adhere to sublayers containing fluorine and that the material of the layer immediately adjacent to the DLC coating must be a substantially optically transparent material devoid of alkali metal atoms and fluorine. Previous work (e.g., National Bureau of Standards Spec. Pub. 638 (1981) and Proceedings of the DARPA Workshop on DLC Coatings (1982)) discusses the adhesion of DLC to fluoride materials for primarily infrared applications. The literature also discusses the use of fluorine additions or dopants to enhance the electronic properties of metal oxide films, but does not focus on their optical characteristics, or other material properties such as hardness, adhesion to other materials, or film degradation.

2. Exemplary OCLI Abrasion Resistant Glass Window

Optical Coating Laboratory, Inc. previously developed a coated glass wear resistant window that exhibits durability approximating that of sapphire, and is less costly. The wear resistant window comprises two layers coated onto the exposed surface of a strengthened, i.e., tempered glass window or base. The first layer deposited on the glass is a relatively thick or massive silicon oxynitride ($SiO_xN_y$) layer prepared by reactive sputtering of silicon in the presence of a gas containing oxygen and nitrogen. The silicon oxynitride layer is approximately five micrometers (50,000 Angstroms) thick. The proportions of oxygen and nitrogen are adjusted during deposition to provide a suitable balance of stress, adhesion, hardness and transparency. The second or top layer is diamond-like carbon (DLC) which is approximately 200 Angstroms (0.02 micrometers) thick. The massive silicon oxynitride "hardcoat" layer imparts a high level of hardness or impact resistance to the window composite, while the DLC overcoating or overlayer contributes low friction or lubricity/lubriciousness.

3. Properties of Abrasion Resistant Glass Window (Window+Hardcoat+DLC Overcoat (FIG. 3))

The family 31 of curves, FIG. 3, depicts the measured spectral transmittance of five non-fluorine-containing windows of the type described above. The data for these windows are the first five entries in Table 1. All windows meet or exceed the minimum acceptable 78% average transmittance for the 600–700 nanometers range. In spite of its small thickness, the DLC layer is quite absorbing and lowers the transmittance of the abrasion resistant window from that of the hardcoat itself. As with the hardcoat layer, the optical performance of the DLC is a consequence of optimized mechanical properties. Deposition process parameter variations that result in increased transparency (lower absorption) diminish the critical mechanical properties of stress, adhesion and friction or lubricity.

The measured values for fifteen production samples (including those from FIG. 3) are listed in Table 1. The data in the last column (average transmittance over the 600–700 nanometers wavelength range) is also shown in the family 41 of data depicted in FIG. 4.

TABLE 1

Measured Transmittanae for 15 Abrasion Resistant Glass Production Samples

| Sample number | Measured Transmittance (percent) | | |
|---|---|---|---|
| | 400 nm | 632 nm | Avg 600–700 nm |
| 1 | 56.78% | 78.11% | 79.02% |
| 2 | 57.39 | 80.52 | 79.42 |
| 3 | 56.56 | 79.30 | 79.30 |
| 4 | 56.01 | 79.21 | 79.21 |
| 5 | 56.95 | 79.17 | 79.17 |

TABLE 1-continued

Measured Transmittanae for 15 Abrasion Resistant Glass Production Samples

| Sample number | Measured Transmittance (percent) | | |
| --- | --- | --- | --- |
| | 400 nm | 632 nm | Avg 600–700 nm |
| 6 | 56.89 | 79.36 | 79.28 |
| 7 | 56.83 | 78.21 | 79.46 |
| 8 | 56.72 | 80.10 | 79.42 |
| 9 | 55.94 | 76.97 | 78.98 |
| 10 | 55.54 | 77.79 | 79.11 |
| 11 | 57.83 | 80.54 | 79.47 |
| 12 | 54.29 | 80.08 | 78.64 |
| 13 | 54.58 | 77.75 | 78.79 |
| 14 | 55.89 | 78.46 | 78.76 |
| 15 | 54.60 | 76.87 | 78.63 |

II. SUMMARY OF THE INVENTION

In one aspect, the present invention resides in the discovery that fluorine can be incorporated in materials such as metal oxides, nitrides, or combinations or mixtures thereof, to modify optical properties such as reflectance and apparent refractive index and physical properties such as hardness and friction, based upon the proportion of the fluorine incorporated in the material and the proportion of fluorine in the deposition mixture, contrary to conventional wisdom, without degrading the adhesion of carbon-containing or carbonaceous overlayers such as hard carbon, hydrogenated carbon, or diamond-like carbon. These fluorine-modified films can be used in many optical designs, including windows or wear resistant coating for laser scanner windows and ophthalmic applications. For example, laser scanner windows can be produced with properties similar to the assignee's above-described previous wear resistant glass window product, but with layers adjacent to the DLC that contain measurable amounts of fluorine for modifying optical and physical properties.

Furthermore, control of the depth and concentration of the fluorine dopant in the outer portion of the silicon oxynitride layer increases the transparency of the window for visible wavelengths. Thus, the controlled inclusion of fluorine in the region of the massive coating adjacent the thin outerlayer can be used to control and enhance both optical and physical properties without degrading adhesion.

The fluorine-containing wear resistant window can be formed for example in reactive vacuum processes used for forming oxides, nitrides or mixed materials, by introducing a fluorine-containing gas or vapor to the process to incorporate fluorine into the final coatings. The concentration of fluorine is controlled by adjusting the ratio of gases or varying other process conditions, thereby controlling fluorine-induced changes in optical and/or material properties. The resulting material can be coated with carbon-containing films such as DLC.

In one particular aspect, the present invention is embodied in an improved wear resistant window comprising: a transparent substrate of material selected from materials such as glass and silica; a relatively thick hardcoat layer comprising material selected from silicon oxide, silicon nitride and silicon oxynitride, formed on the substrate; and a relatively thin carbon-containing overcoat layer formed on the hardcoat, the carbon-containing material selected from hard carbon, hydrogenated carbon and diamond-like carbon. The hardcoat also comprises fluorine in a thin surface region adjacent the overcoat for controlling optical and mechanical properties.

III. BRIEF DESCRIPTION OF THE DRAWING

The present invention is described below with reference to the drawing, in which.

IV. DETAILED DESCRIPTION OF THE PREFERRED EMBODIMENT(S)

A. Overview of Wear Resistant Window Composite

1. Composite Structure

As alluded to above, under continuous use (i.e., subjected to mechanical abrasion), minimum transmittance must be maintained for scanner windows to avoid misreads. Therefore, one must balance transparency and resistance to mechanical abrasion in the selection of materials or coatings. This balance assures a fully functional product. One approach to achieving this balance is to combine hard, durable coatings with low friction overcoats. We have found that fluorine added to the hard, durable coating does not jeopardize adhesion of a carbonaceous overcoat (contrary to the teachings of U.S. Pat. Nos. 5,135,808 and 5,268, 217) and improves transmittance by modifying (lowering) the effective refractive index of the coating design.

Figure 9:
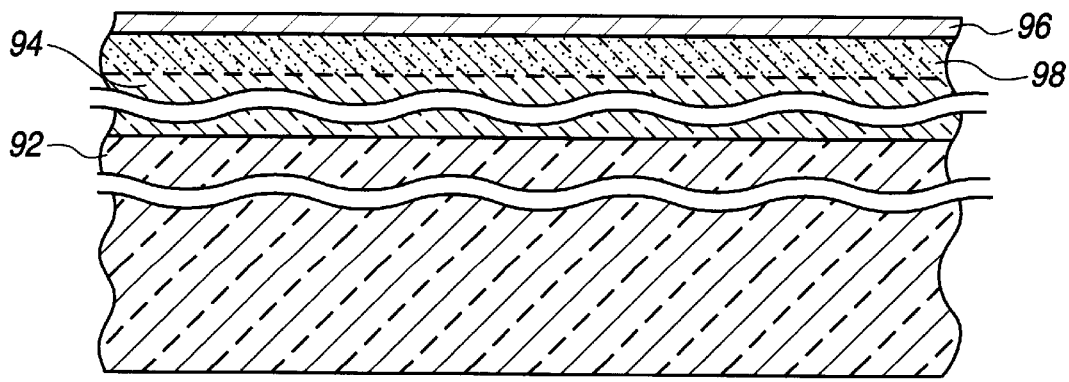
FIG. 9 is a schematic cross-section (not to scale) of a abrasion resistant glass window, designated 90, in accordance with the present invention. Arrows 9—9 in FIG. 8 indicate the structure therein which corresponds generally to the structure of FIG. 9.

FIG. 9 depicts a preferred embodiment 90 (not to scale) of a wear resistant window in accordance with the present invention. The window 90 comprises a substrate or window 92 of material such as glass, which preferably (and by way of illustration, not limitation) is transparent over the spectral range of interest, here about 600 nm–700 nm. Illustratively, but not by way of limitation, the window or substrate 92 may be about 5–6 millimeters thick. A massive layer or hardcoat 94 is formed on the window 92. The hardcoat 94 preferably comprises silicon oxynitride. A very thin carbon-containing layer 96 of material such as DLC is formed on the hardcoat 94. Preferably, a thin surface adjacent region or layer 98 of the hardcoat 94 is doped with fluorine to enhance physical and optical properties of the composite 90. Illustratively, the thickness dimensions of (1) the relatively massive layer or hardcoat 94, (2) the relatively very thin carbon-containing overcoat 96 and (3) the relatively thin surface-adjacent region 98 of the hardcoat where the fluorine is concentrated are, respectively, (1) 5 micrometers, (2) 200 Angstroms, and (3) 1000–2500 Angstroms.

2. Hardness and Durability of Window Containing Silicon Oxynitride Hardcoat Layer The apparent hardness of a thin film is affected by the hardness and the proximity of the substrate. Thus, although silicon nitride is harder than glass, the hardness of silicon nitride coated glass depends on the thickness of the film. Films a few tens of Angstroms thick offer little increase in hardness whereas the hardness of films which are a few micrometers thick is similar to that of bulk silicon nitride. Furthermore, the durability of silicon nitride coatings depends on adhesion and stress, as well as hardness. Although the adhesion and stress of reactively sputtered silicon nitride films are dependent upon the film deposition processing parameters, the dependencies are rather weak and it is difficult, if not impossible, to prepare thick, adherent layers of silicon nitride on glass with low stress. However, the addition of a small amount of oxygen to the chamber during the deposition process, resulting in the formation of silicon oxynitride or oxygen-containing silicon nitride, improves the stress and adhesion with only limited change in hardness, and thus improves durability.

As alluded to above, the hardcoat portion of the assignee's wear resistant window is ≧5 micrometers thick. This thickness is preferred presently at least in part because it is understood to provide an optimum combination of durability and hardness for the POS application and because mechanical abrasion resistance is decreased for thicknesses <5 micrometers.

Because macroscopic hardness is determined primarily by the massive hardcoat layer 94 and is relatively insensitive to the properties of the much thinner DLC layer 96, hardness testing may be applied to the hardcoat layer before the DLC is added. Thus, hardcoat layers 94 5 micrometers thick formed on glass substrates 92 using the process described subsequently were tested using a Leco® M-400-G3 microhardness tester. In the test, a pyramid-shaped diamond point was pressed against the surface to be tested and the resulting indentation was measured to determine the surface hardness. Typically, the microhardness values of uncoated glass and uncoated sapphire tested at a load of 25 grams are about 500 knoop and 2100 knoop, respectively. The measured microhardness values of the silicon oxynitride hardcoat-coated windows were within the approximate range 800–1200 knoop. Although higher hardness values are desirable for wear resistance, they are associated with increased stress, decreased adhesion, and the onset of optical absorption. Our initial production acceptance level was 850 knoop. Currently, we have an acceptance range of 1000–1200 knoop, i.e., 1100±100 knoop.

3. Optical Characteristics of Window Containing Silicon Oxynitride Hardcoat a. Interference Effects Besides the required mechanical properties of durability and hardness, the optical transmission of the hard coated window 90 must be high, preferably comparable to that of an uncoated glass or sapphire window. The hardcoat layer 94 is transparent, virtually free of absorption. However, because it has an index of refraction that is different from the index of refraction of glass, the reflection will be different from the reflection of uncoated glass. The optical thickness of the hardcoat layer is very much greater than a quarter of the wavelength of visible light and, therefore, the effect of interference light reflected by the two surfaces of the hardcoat layer is minimal.

b. Control of Index of Refraction

The index of refraction of silicon nitride is about 2.0 for visible light including laser wavelengths in the 600–650 nanometers region of the spectrum. The index of refraction of silicon oxide over this portion of the spectral region is about 1.5. The index of refraction of silicon oxynitride is intermediate the values for silicon nitride and silicon oxide, and increases with the concentration of nitrogen. Silicon oxynitride films with optimum adhesion, stress and hardness have approximately equal average amounts of oxygen and nitrogen with average index of refraction in the range 1.7–1.9. The index of refraction has subtle (intrinsic) variations in each thickness range of about 100 Angstroms. Thus, the approximately 5 micrometer thick hard coat layer has an average index of refraction about 1.8 with a slightly lower value in the initial portion adjacent the glass substrate and slight (intrinsic) variations with thickness or depth periods of approximately 100 Angstroms.

c. Transmittance (FIG. 1)

Figure 1:
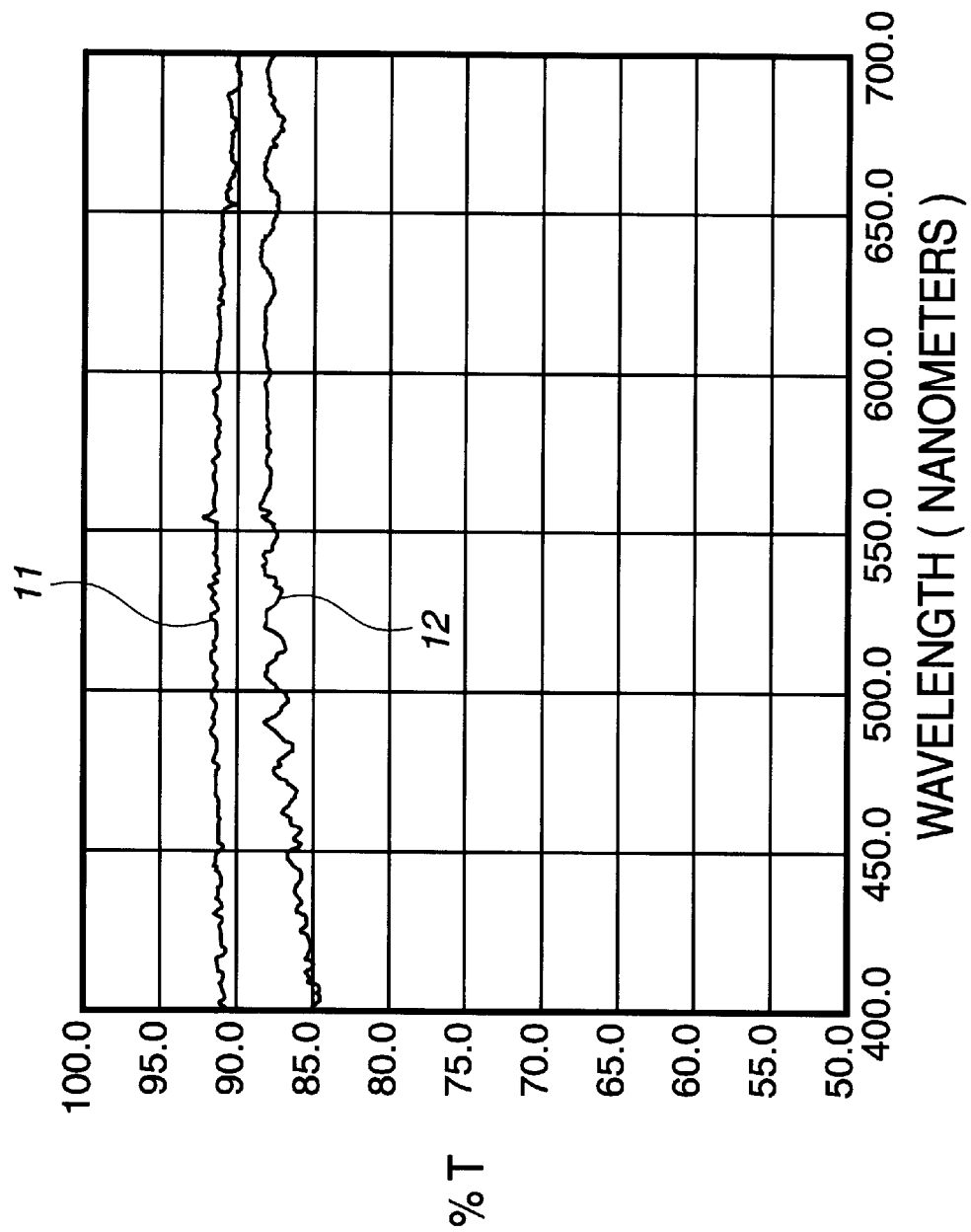
FIG. 1 depicts the measured spectral performance in terms of transmittance (%T) as a function of wavelength in nanometers (nm) of both an uncoated glass window and a similar window covered with a non-fluorine-containing massive coating.

FIG. 1 depicts the measured transmittance versus wavelength for (A) an uncoated glass window, curve 11, and (B) a similar window with a non-fluorine-containing hardcoat layer of the type described previously which is prepared by OCLI, curve 12. (Note that the abrasion resistant glass product comprises a glass substrate or window and two thin-film layers, a relatively thick hard coat and a relatively thin, lubricous DLC layer). The transmittance curve 12 of FIG. 1 has three features: (1) overall shape of the uncoated glass curve with a gradual decrease at shorter wavelengths, (2) about 3% lower transmittance than uncoated glass in the 600–650 nanometers wavelength region, and (3) a "fine structure" with cycle-lengths ranging up to about 20 nanometers and amplitudes ranging up to about 1.5%. The fine structure of curve 12 is attributable to interference effects in combination with the slight variations in index of refraction described above. As expected, the wavelength locations and amplitudes of the fine structure vary with location of the measurement position on the window and between windows. Generally, this transmittance curve 12 is typical of a massive layer of higher index of refraction on a glass window.

d. Theoretical Transmittance Vs. Refractive Index of refraction for Glass Substrate and Hardcoat Composite (FIG. 2)

Figure 2:
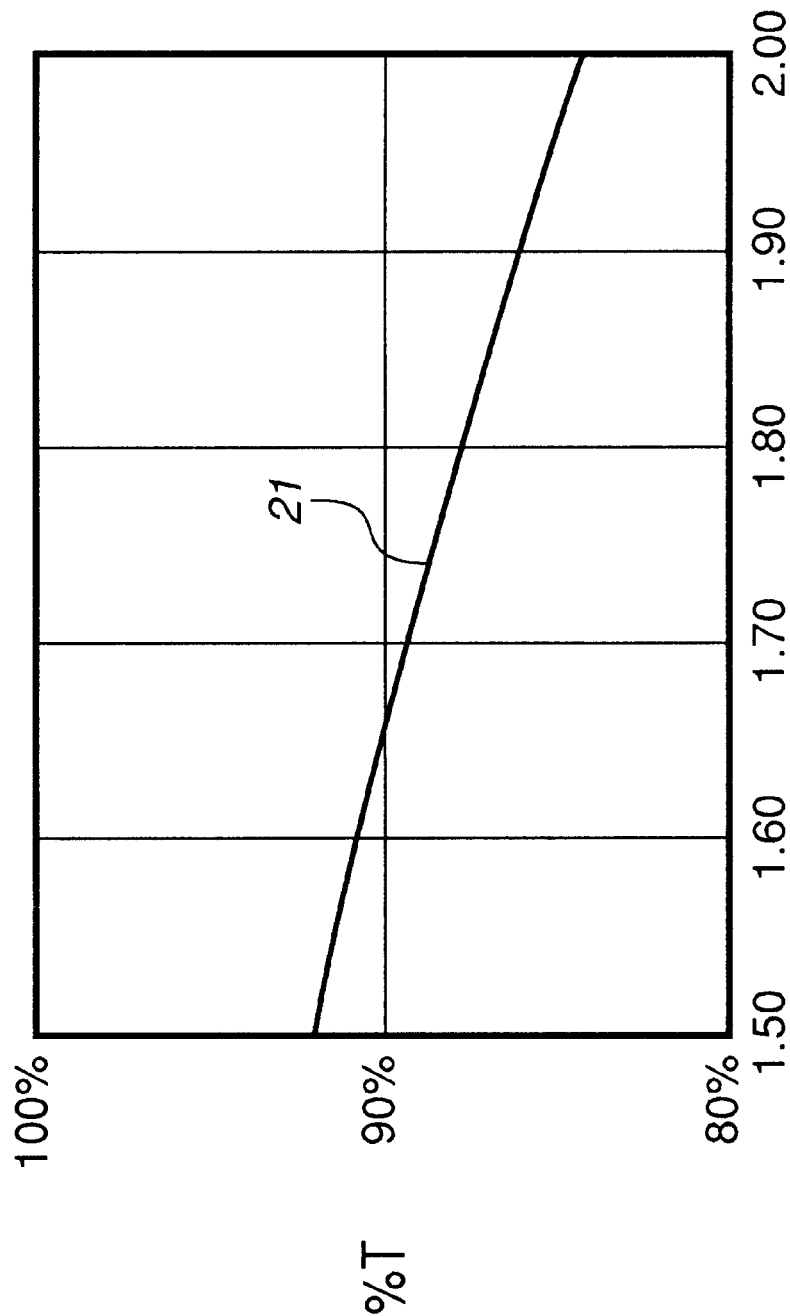
FIG. 2 depicts the theoretical spectral transmittance of a glass window having a non-fluorine-containing massive coating plotted against the index of refraction of the coating.

FIG. 2, curve 21, depicts the theoretical relationship between the transmittance of a glass window with a massive coating versus the index of refraction of the coating. This figure expresses the equation $$T_{overall} = \frac{(1-R_w)(1-R_{wc})(1-R_c)}{(1-R_wR_{wc})-R_c[R_w(1-R_{wc})+R_{wc}(1-R_w)]},$$

where $R_w = ((1-n_w)/(1+n_w))^2$, $R_c = ((1-n_c)/(1+n_c))^2$, and $R_{wc} = ((n_w-n_c)(n_w+n_c))^2$.

$R_w$, $R_c$ and $R_{wc}$ are the reflectance values for the three interfaces, the index of refraction of the window, $n_w$, being 1.52, and the index of refraction of the coating, $n_c$, being between 1.50 and 2.00. Comparing the measured transmittance of the hardcoat at 600 nanometers, FIG. 1, with FIG. 2, verifies that the index of refraction of the hardcoat is approximately 1.8.

B. Reactor System and Process for Forming the Wear Resistant Window Composite

1. Reactor System and Process Overview

For purposes of our discussion, and except where noted, the type of vacuum reactive sputter deposition chamber presently used to form wear resistant window composites in accordance with, and which embody, the present invention, is similar to the vertical-cylinder processing chamber described in commonly assigned U.S. Pat. No. 4,851,095 (which is hereby incorporated by reference), with the following differences. In the applicable embodiment disclosed in the '095 patent, the target(s) used for deposition and the ion source device(s) used for reacting the deposited material are located in different, spaced-apart regions of the chamber, and deposition and reaction of the material are done separately in the spaced regions.

The present vacuum reactive sputter deposition system incorporates a gas inlet manifold (or manifolds) positioned adjacent the target (targets) for reacting with material sputtered from the target as that material is deposited onto substrates carried on a rotating vertical cylindrical rack.

A preferred set-up uses a dual C-Mag™ sputter deposition device, which is available from Airco Coating Technology and comprises two water-cooled, rotating, cylindrical sputter targets that are combined with permanent magnets and are configured to provide high rate sputtering of the cylindrical target surfaces. Aluminum-doped silicon cylindrical targets have been used to sputter deposit silicon. As with most metals, the reactivity of silicon with oxygen and with nitrogen differs significantly. In the presence of a plasma activated mixture of oxygen and nitrogen gases, the oxide tends to form more readily than the nitride. For that reason the surface of the silicon target tends to be partially covered with silicon oxide and the sputtered species includes both pure silicon and silicon oxide.

In the presence of oxygen gas at low pressures, the sputtered silicon condenses on the substrate and reacts to form silicon oxide. When oxygen- and nitrogen-containing gases such as nitrogen, oxygen or nitrous oxide ($N_2O$) are added to the sputtering environment, an oxygen-, nitrogen-, and silicon-containing film is formed. This film is here termed silicon oxynitride or oxygen-containing silicon nitride, although we have no knowledge that it consists of a specific compound. The film may be a specific compound, or may comprise a solid state mixture of several compounds of the three elements and/or may comprise various compounds of the three elements. The oxygen and nitrogen composition of the resulting film may be varied in proportion to the concentration of oxygen and nitrogen in the sputter gas. This composition control is termed "extrinsic" in that it results from changes in externally-controlled factors, such as computer-controlled or operator-controlled flow rates of the reactive gases.

The sputter target is located on the inner perimeter of the chamber and subtends a small fraction of the circumference. Therefore, when the rack is continuously rotated in the chamber the glass substrates spend a portion of each rotation cycle in the plasma-activated region in front of the target. In this plasma-activated region, both the intensity of the reactive gas plasma and the rate of the sputter deposition vary from weak to strong from the edge to the center of the sputter-target. As a consequence of these complex and imperfectly understood factors the composition of the mini-layer that is grown during each rotation of the substrate holder varies with depth. This is termed the "intrinsic" concentration variation because it is primarily a function of equipment and process factors that are not varied externally during a single rotation of the substrate. The rotation speed and sputter target power are adjusted so that a layer of the silicon oxynitride approximately 100 Angstroms (0.01 micrometers) thick is deposited during each rotation. The 5 micrometer think hardcoat layer thus comprises about 500 mini-layers.

After the hardcoat is applied in the reactive sputter processing chamber described above, the windows are transferred to an continuous in-line vacuum deposition machine where the DLC layer is applied by a plasma enhanced chemical vapor deposition (PECVD) process. In the PECVD process, the window passes through an rf-excited plasma in a mixture of butane and hydrogen gasses. The plasma power and conveyer speeds are adjusted so that approximately 200 Angstroms of DLC is deposited during this exposure.

2. optimizing Optical and Physical Properties of the Hardcoat

As described above, the hardcoat layer is composed of silicon, oxygen and nitrogen where the concentrations of oxygen and nitrogen are adjusted primarily by the in-flow rates of gases to the process chamber and secondarily by the sequential exposures of the films during each rotation of the rack. The average or extrinsic concentration of the layer is determined by the in-flows of the reactive gases and the subtle intrinsic variations that extend over the depth of each mini-layer are inherent in the equipment and choice of the fixed process parameters. In practice, the rack rotation speed is maintained constant and the sputter target power and composition and ratio of the gasses are adjusted in increments or steps during the hardcoat layer deposition process. Typically, the $N_2O:N_2$ in-flow ratio is set at about 0.3:1 during the formation of approximately the first one-tenth of the hardcoat layer and is reduced to approximately 0.2:1 during the remainder of the process of forming the 5 micrometer thick hardcoat. During the initial period of elevated $N_2O$ in-flow, the sputter target power is increased from about 2.5 kw to 4 kw in seven equal steps. These parameters are chosen to provide hard, adherent, transparent films with low stress.

3. Fluorine-Doped Improvement of Wear Resistant Composite

The transmittance of our abrasion resistant glass is limited by the reflectance of the non-absorbing hardcoat and the absorption of the DLC layer. These factors act independently and it has not been possible to improve either factor by simple changes in deposition process parameters without degrading mechanical properties. That is, transmittance cannot be improved using process parameters without detracting from mechanical properties. However, a technique has been discovered which reduces the reflectance of the hardcoat and, therefore, increases transmittance. Specifically, when a small amount of fluorine gas is added to the nitrogen ($N_2$) and nitrous oxide ($N_2O$) sputter gases (for example, by adding carbon tetrafluoride ($CF_4$)), fluorine is added to the deposited film, lowering its index. More generally, in reactive vacuum processes which form oxides, nitrides or mixed materials, a fluorine-containing gas or vapor can be added to the gas in the process chamber to incorporate fluorine into the final coatings. The amount of fluorine which is added is controlled by adjusting the ratio of the gases or varying other process conditions. Changes in optical and/or material properties can be achieved by varying the fluorine content of the inlet gas flow. Carbonaceous films such as DLC can then be formed on the fluorine-containing surface-adjacent region of the oxide-, nitride- and silicon-containing coating. Fluorine-doped silicon oxynitride layers are stable, and unchanging over time under normal and elevated temperature conditions, i.e., the fluorine appears to be chemically combined in the silicon oxynitride. This, despite the fact that the two fluoride compounds of silicon ($Si_2F_6$ and $SiF_4$) are gases under normal conditions, unlike oxide and nitride compounds of silicon.

Fluorine doping of the hardcoat layer potentially lowers the index of refraction. However, as with oxygen doping, fluorine doping also reduces hardness somewhat. It has been discovered that the effects of fluorine doping can be made optimal, that is, the beneficial effects such as lowering the index of refraction can be implemented and the deleterious effect of diminished hardness can be minimized, by adding the fluorine in a thin, last-deposited, surface-adjacent region or stratum of the hard coat layer so that this very thin, reduced index surface-adjacent region acts similarly to a single-layer interference coating. Any small reduction in the hardness of the very thin fluorine-doped region is compensated by the much larger thickness of the non-fluorine-doped portion of the layer.

4. Fluorine-Induced Reflection & Transmittance Improvement a. $MgF_2$ Layers (FIG. 5)

Figure 5:
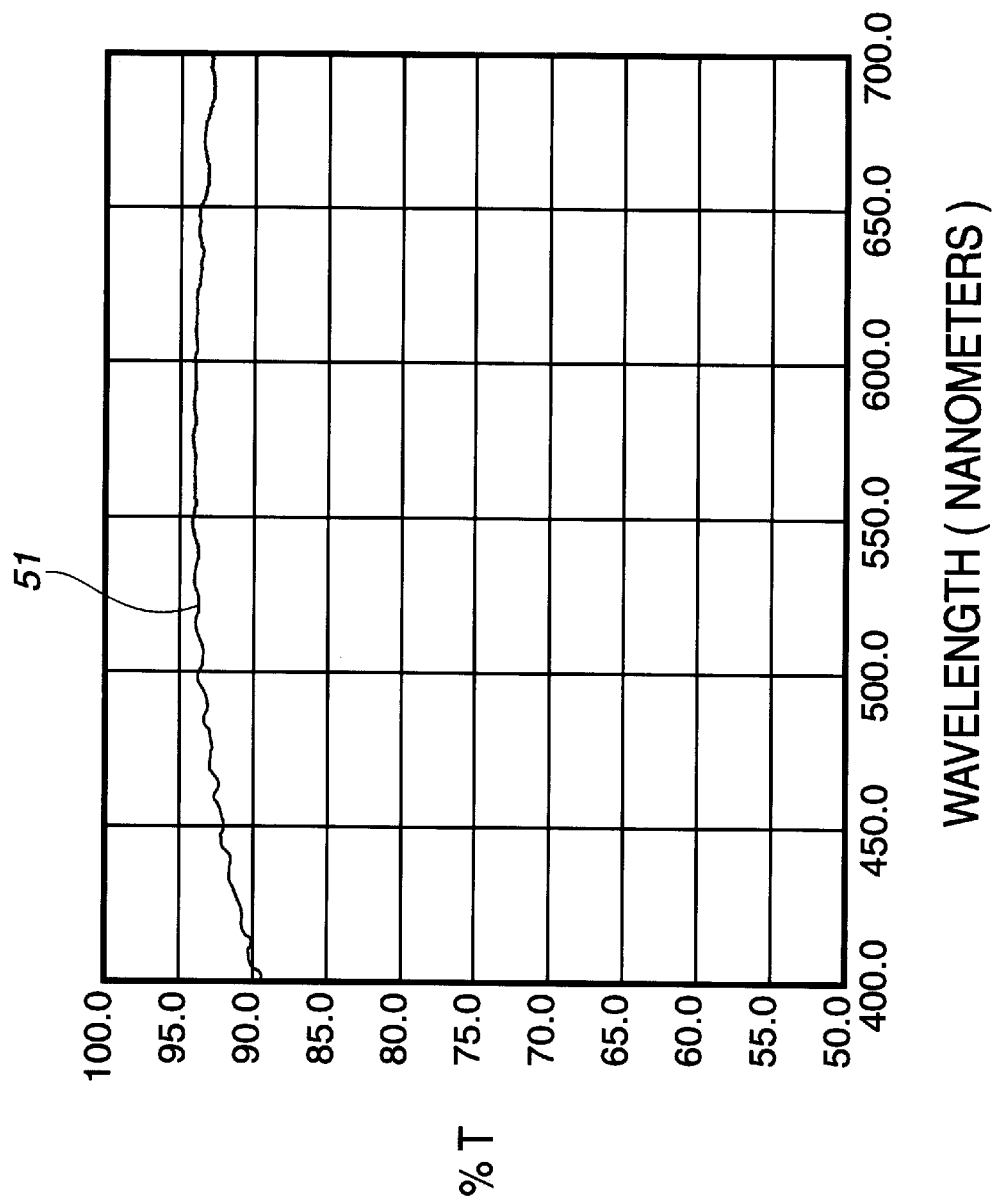
FIG. 5 depicts the measured transmittance as a function of wavelength of a non-fluorine-containing hardcoat (glass substrate+hardcoat) on which was deposited by vacuum evaporation a layer of magnesium fluoride.
Figure 6:
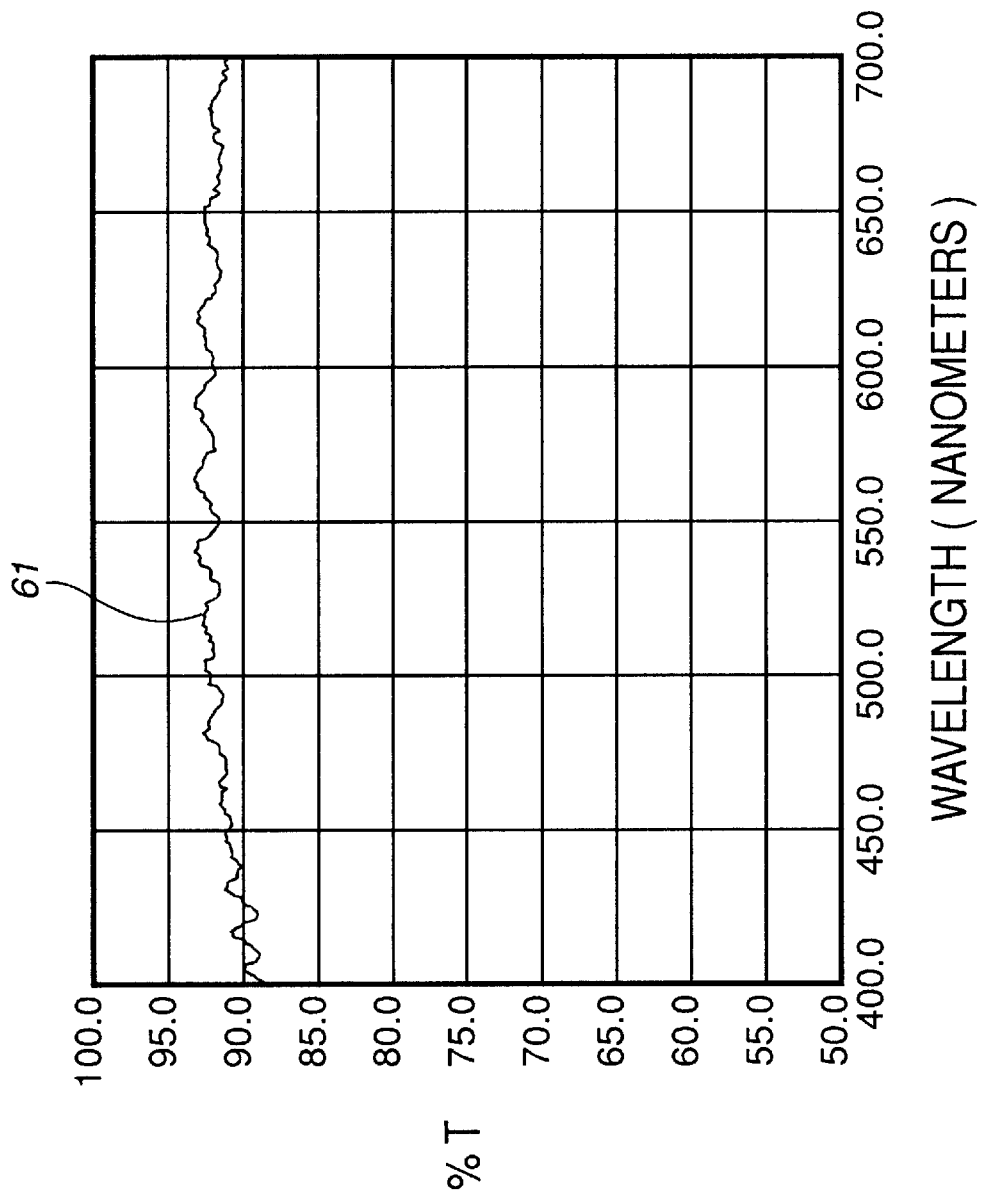
FIG. 6 depicts the measured transmittance as a function of wavelength of a 5-micrometer thick hardcoat layer in which fluorine is present in approximately the last-deposited, 1000 Angstroms thick surface-adjacent region in accordance with the present invention.
Figure 7:
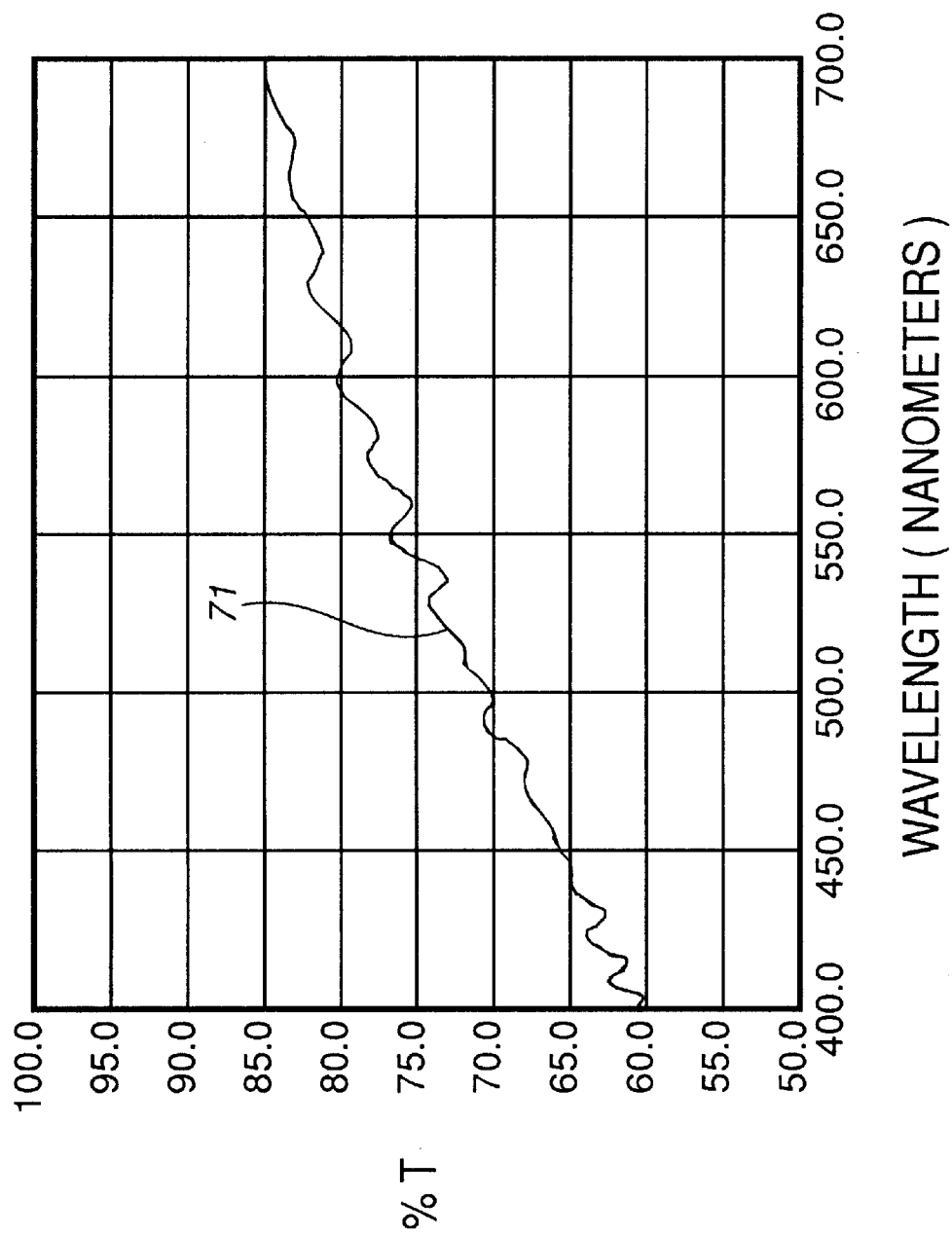
FIG. 7 depicts the measured transmittance as a function of wavelength of an improved wear resistant window comprising a fluorine-doped hardcoat layer and a DLC overcoat about 200 Angstroms thick in accordance with the present invention (see FIG. 6 for the transmittance performance of the hardcoat-covered window without the overcoat).
Figure 8:
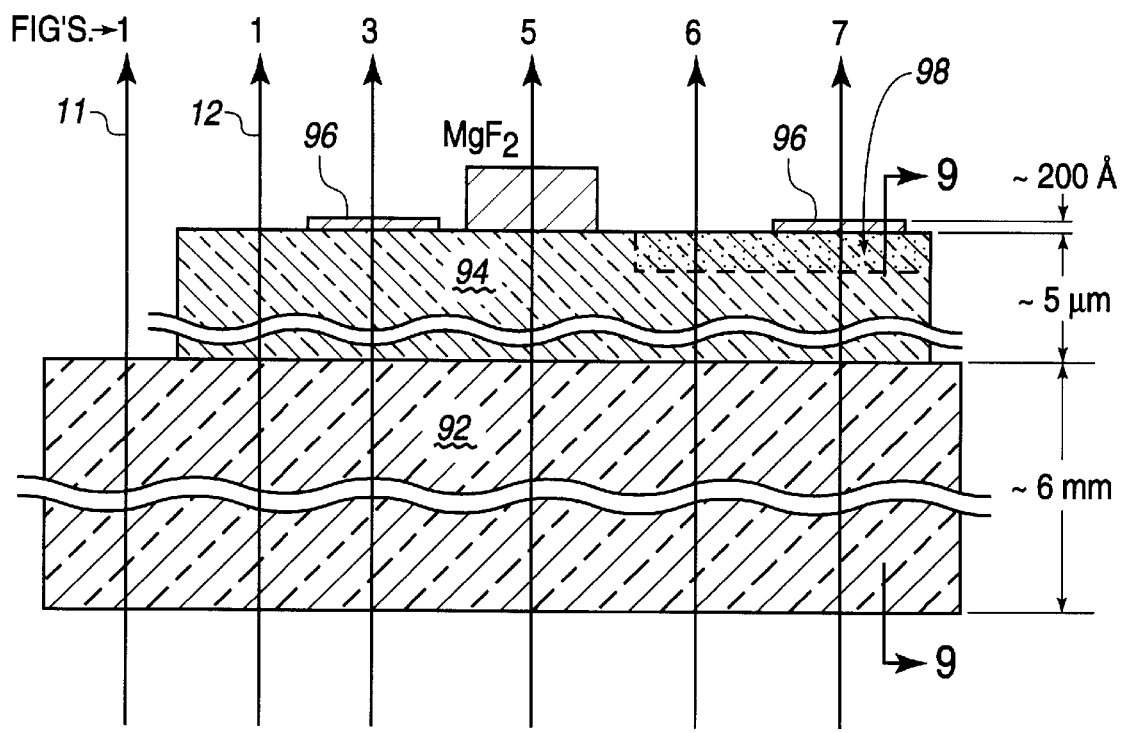
FIG. 8 is provided as a guide to the structures depicted in or analyzed in the other figures.

Indicative of the potential of fluorine for improved transmittance of the hardcoat, curve 51 of FIG. 5 depicts the measured transmittance of a prior-art, non-fluorine-containing hardcoat on which was deposited by vacuum evaporation a layer of magnesium fluoride ($MgF_2$) which had an index of refraction of 1.38 and a quarter-wave optical thickness (QWOT) of 600 nanometers. Such a layer effectively eliminates reflection between the hardcoat material and air: the theoretical value of the reflectance of the air/hardcoat interface was 0.0816 (8.16%) before the $MgF_2$ layer was added and 0.00079 (0.08%) after the addition. The estimated transmittance of the hardcoated window with the quarter-wave $MgF_2$ layer was 95%, about 1% higher than the measured value shown in FIG. 5. FIG. 5 demonstrates that the reduction of the reflection at the outermost surface of the hardcoat will substantially increase the transmittance of the abrasion resistant glass product.

b. Transmittance of Fluorine-Containing Hardcoat Layer (FIG. 6) and DLC-Coated Composite (FIG. 7)

Figure 3:
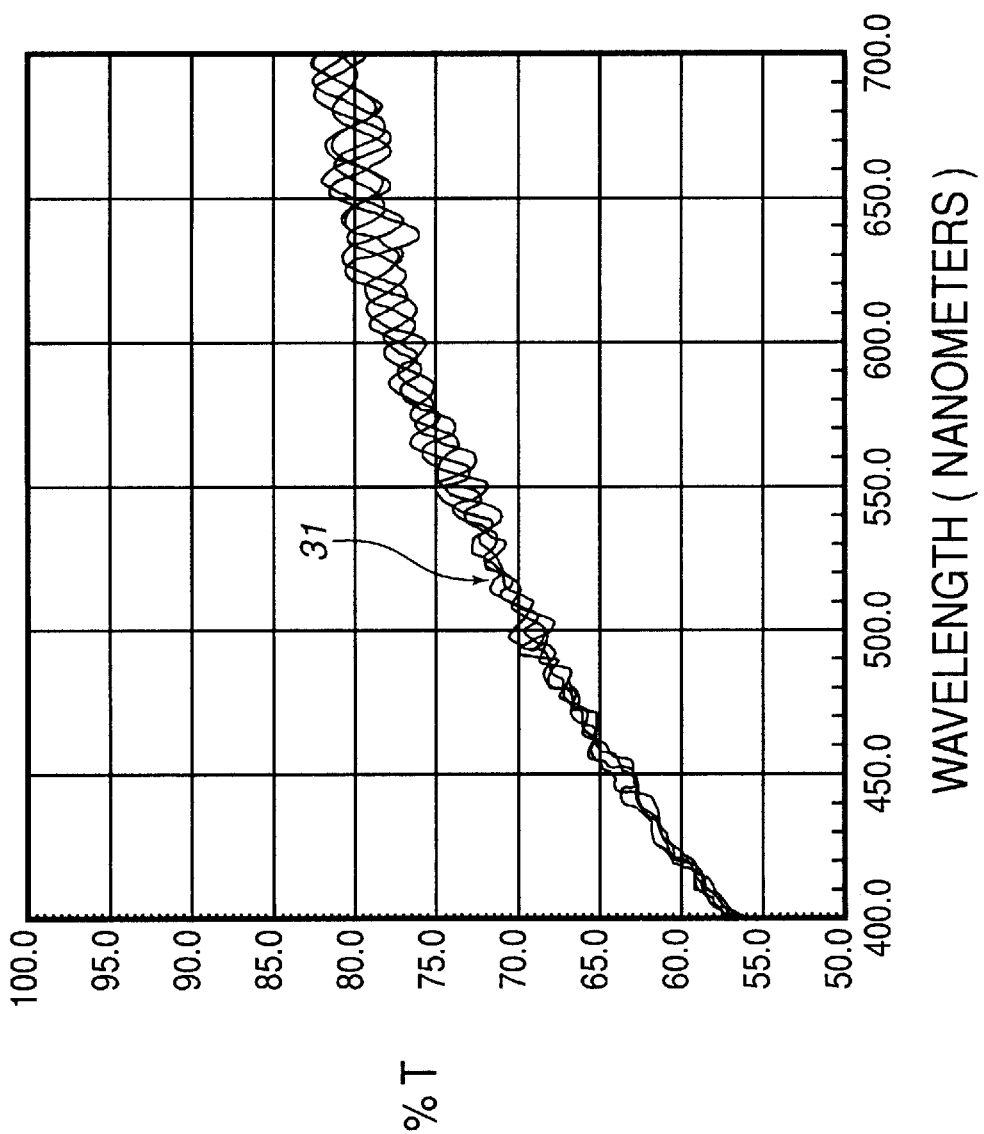
FIG. 3 depicts the measured spectral transmittance of Table 1's first five windows (glass substrate+non-fluorine-containing massive hardcoat+DLC overcoat) as a function of wavelength.
Figure 4:
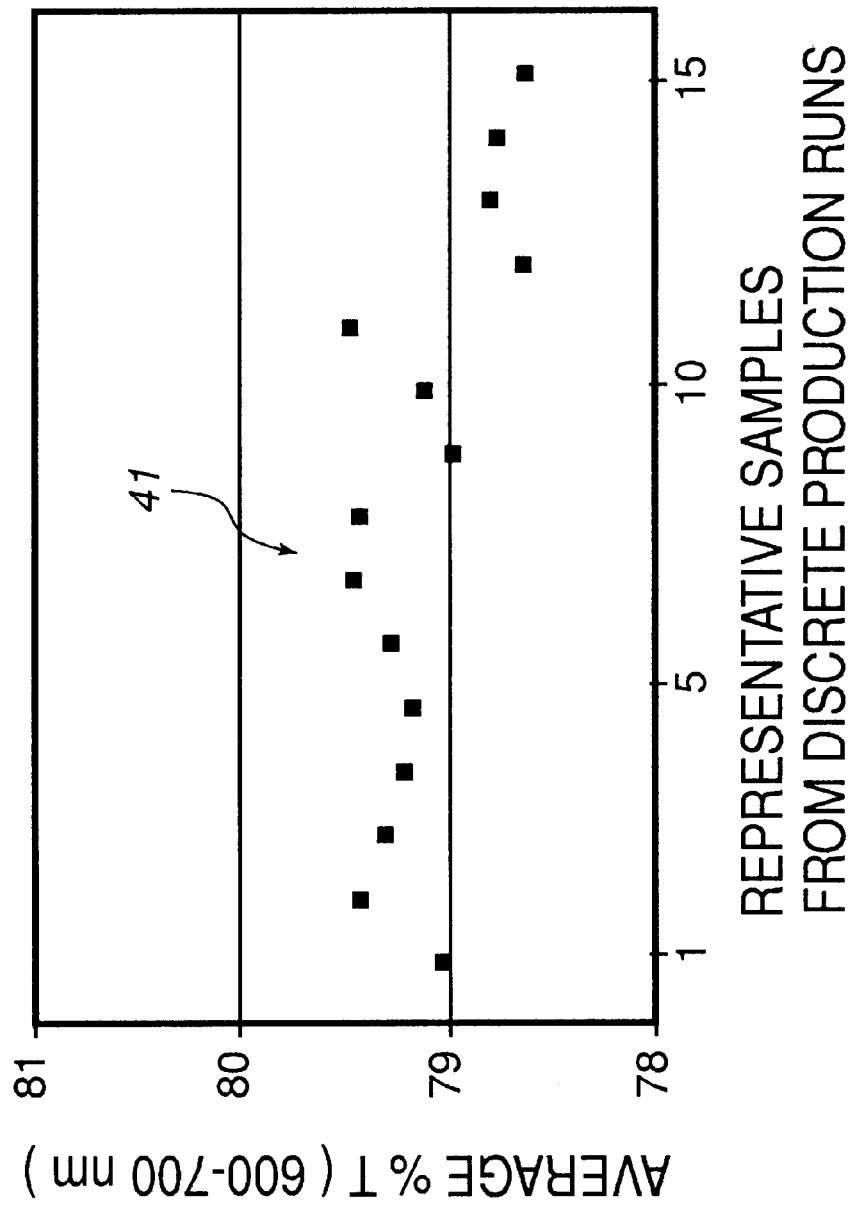
FIG. 4 depicts the average spectral transmittance in percent over 600–700 nm for the 15 non-fluorine-containing windows of Table 1.

Unlike silicon oxynitride, $MgF_2$ is not hard. In fact there is no known low index of refraction material having sufficient hardness for use as a quarter-wave anti-reflection layer in this application. However, it has proven feasible to create a layer or stratum having effectively a low index of refraction by adding fluorine to a very thin outer surface-adjacent region of the silicon oxynitride hardcoat layer. Curve 61 of FIG. 6 depicts the measured transmittance of a 5 micrometer thick hardcoat layer in which fluorine is present in approximately the last-deposited, 1000 Angstroms thick surface-adjacent region in accordance with the present invention. The transmittance of the resulting hardcoat layer over 600–650 nanometers is only slightly lower than that of $MgF_2$ (curve 51, FIG. 5) and is much higher than that of the original hardcoat (curve 12, FIG. 1). FIG. 7 depicts the measured transmittance of the improved wear resistant window product comprising the fluorine-doped hardcoat layer (shown in FIG. 6) and a DLC coating about 200 Angstroms thick. Average transmittance is 80.92% over 600–650 nanometers, a substantial improvement over the production values shown in FIGS. 3 and 4, and in TABLE 1.

C. Examples of Fluorine-Doped Optical Composites

Example 1. A batch (run) of thin films approximately 2200 Å thick were formed on glass substrates by reactive sputtering using a C-Mag™ aluminum-doped silicon sputter target and a gas mixture of 215 sccm nitrogen, 35 sccm $N_2O$, and 12.5 sccm $CF_4$. The substrates were mounted on a rotatable drum that traversed the front of the rotating C-MAG™ target twice during the deposition run (~1100 Å/pass deposition rate). Extended RBS (Rutherford Backscattering Spectroscopy) analysis was used to measure the stoichiometry of the deposited films, and trace the atomic concentration gradients as a function of coating depth. Average stoichiometric ratios for the components Si/O/N/F were 0.32/0.23/0.26/0.19, respectively (the relative concentrations of the constituent elements varied slightly as the substrates moved past the target). The fluorine content was clearly discernable.

Example 2. A second batch (run) of thin film samples about 2200 Å thick were formed using the process conditions of Example 1 except that a reduced $CF_4$ flow of 5 sccm was used. Again, extended RBS analysis was used to determine stoichiometry and trace the atomic concentration gradients as a function of coating thickness. In addition to the above elements, the analysis measured the aluminum incorporated in the film from the aluminum-doped Si target. The atomic ratios for Si/Al/O/N/F were 0.32/0.025/0.29/0.28/0.085. Again, the fluorine content was clearly measurable.

Example 3. A sample from the run of Example 2 was subsequently coated with the above-described approximately 200 Å thick DLC coating during a production run of POS parts. RBS analysis of the composite coating clearly showed the carbonaceous coating, and traced the concentration gradients of the hardcoat from Example 2. RBS analysis of the interlayer stoichiometry indicated the average composition of the interlayer in terms of the constituent elements Si/Al/O/N/F was 0.32/0.025/0.29/0.28/0.083. This shows that fluorine is easily detected in the hardcoat layer even after overcoating with the DLC film and is present at concentration levels comparable to those measured prior to the formation of the DLC coating. (RBS error bars are $\leq 0.005$.)

Example 4. A batch of thicker, POS-type interlayers was formed using the target described in the previous examples. Nitrogen and nitrous oxide gases were used for reactive sputter deposition of the bulk of the interlayer. A 5 sccm flow of $CF_4$ was added during the formation of the last ~2200 Å, surface-adjacent portion of the hardcoat film, duplicating the parameters of Example 2. RBS analysis indicated a fluorine atomic concentration of 8% in this surface-adjacent portion of the film. This is comparable to the fluorine concentration of the thin film coatings of Example 2.

Example 5. Samples from Example 4 were overcoated with DLC during a POS production run. RBS analysis of a pyrolytic carbon part coated in Example 4 and then overcoated with DLC during this production run revealed a fluorine atomic concentration of ~8% in the interlayer portion of the hardcoat adjacent the DLC layer. The use of severe adhesion tests (e.g., scratching with a diamond stylus loaded to 0.71 lbs, extended humidity/temperature exposure; and boiling a diamond-scratched part for five minutes, then running cold water over the heated surface) revealed that adhesion of the overcoated example was as good as that of the standard POS product (without fluorine). Other optical and material properties (hardness, coefficient of friction) were within standard POS specifications.

Example 6. During the preparation of thick, POS-type interlayers in a production environment, $CF_4$ was added to the reactive sputtering gas mixture during deposition of the last ~2000 Å of the hardcoating, to form a fluorine-enriched interlayer. Interlayers prepared using different $CF_4$ flow rates (0 scam (standard, non-fluorine-containing hardcoat); 10 sccm; 6 sccm; and 4 scam) were accompanied by the microhardness, transmittance, and gloss values in Table 2, below. Please note, the change in gloss readings relates to differences in the refractive index due to different stoichiometries in the deposited film.

TABLE 2

Effect of Fluorine on Selected Optical and Mechanical Properties

| Run # | $CF_4$ Gas Flow | Microhardness Knoop | % T (Avg, 600–700 nm) | Gloss |
|---|---|---|---|---|
| Std. | none | 1100 ± 50 | 88–8.9 | 147–151 |
| 1 | 10 sccm | 930 | 92 | 110 |
| 2 | 6 sccm | 1020 | 88.3 | 144 |
| 3 | 4 sccm | 1080 | 88.1 | 147 |

Table 2 Illustrates that the use of a fluorine-containing gas or vapor to add fluorine to the interface region of the hardcoat affects the optical and material properties of the film. A limiting effect on %T was observed because this fluorine-containing layer thickness (–2000 Å) was not optimized for anti-reflectance (optical) properties. In contrast, FIG. 6 shows considerably higher transmittance (average ~92+%) for an optimized thickness of the fluorine-enriched layer.

RBS analysis of thin layers made under the conditions of the last ~2000 Å of Example 6 runs 2 and 3 using the production machine indicates these films averaged approximately 10.6 and 6.3 atomic percent fluorine, respectively. The concentration variation differs from that observed using a pilot machine, and presumably is caused by the different process configurations of the two machines. In the Example 6 runs, the concentration of fluorine was lower when the fluorine-containing gas was first added, and increased with time during continued deposition. Final atomic concentrations for fluorine for the two films averaged above were 12.5% and 7.8%, respectively.

D. Summary of Certain Fluorine-Modified Optical and Physical Properties; Extension of the Invention The conventional wisdom, as represented by U.S. Pat. Nos. 5,135,808 and 5,268,217, is that overlayers such as hard carbon, hydrogenated carbon, or diamond-like carbon (DLC) will not adhere to layers which contain fluorine. The findings of the present discovery and invention are to the contrary. Carbonaceous coatings such as DLC coatings adhere to layers that contain measurable amounts of fluorine in surface-adjacent regions. In addition, optical properties such as reflectance and apparent refractive index of refraction and physical attributes, such as hardness, friction, etc., of metal oxides and nitrides and films that combine these materials can be improved by incorporating fluorine, and can be varied by altering the fluorine content, at the surface-adjacent (DLC-adjacent) regions of such films. The fluorine-modified films can be used in many optical designs, including windows or wear resistant coatings for laser scanner windows and ophthalmic applications.

Those of usual skill in the art will readily apply the description here to devise additional modifications embodiments of the invention which are within the scope of the appended claims.

What is claimed is:

1. A wear-resistant window comprising: a transparent substrate; a hardcoat layer formed on the substrate; a carbon-containing overcoat layer formed on the hardcoat layer; the hardcoat layer and the overcoat layer providing high transparency for visible radiation, hardness, low friction and lubricity to the window; the hardcoat layer further comprising a fluorine-doped region adjacent to the overcoat layer and a non-fluorine-doped region adjacent to the substrate, the hardcoat layer having a thickness of about 40,000–60,000 Angstroms, with the fluorine-doped region thereof having a thickness of about 1000–2500 Angstroms, wherein the fluorine-doped region enhances transmittance without degrading adhesion of the overcoat layer and hardness of the hardcoat layer.

2. The wear-resistant window of claim 1, wherein the substrate comprises glass, the hardcoat layer comprises silicon oxynitride and the overcoat layer comprises diamond-like carbon.

3. The wear-resistant window of claim 1, wherein the overcoat layer is about 100–300 Angstroms thick.

4. The wear-resistant window of claim 1, wherein the hardcoat layer comprises a material selected from the group consisting of silicon oxide, silicon nitride, silicon oxynitride, and combinations thereof.

5. The wear-resistant window of claim 1, wherein the hardcoat layer comprises a non-fluorine-doped silicon oxynitride layer formed on the substrate and a fluorine-doped silicon oxynitride layer formed in a surface region underneath the overcoat layer.

6. The wear-resistant window of claim 1, wherein the overcoat layer comprises a material selected from the group consisting of hard carbon, hydrogenated carbon, diamond-like carbon, and combinations thereof.

7. A wear-resistant window comprising: a transparent substrate; a hardcoat layer selected from the group consisting of silicon oxide, silicon nitride, silicon oxynitride, and combinations thereof formed on the substrate and doped with fluorine such that the hardcoat layer comprises a fluorine-doped region and a non-fluorine-doped region; a carbon-containing overcoat layer formed on the hardcoat layer, the carbon-containing overcoat layer selected from the group consisting of hard carbon, hydrogenated carbon and diamond-like carbon; the hardcoat layer and the overcoat layer providing high transparency for visible radiation, hardness, low friction and lubricity to the window; wherein the hardcoat layer has a thickness of about 40,000–60,000 Angstroms, with the fluorine-doped region thereof being adjacent to the overcoat layer and having a thickness of about 1000–2500 Angstroms, the fluorine-doped region enhancing transmittance without degrading adhesion of the overcoat layer and hardness of the hardcoat layer.

8. The wear-resistant window of claim 7, wherein the substrate comprises glass, the hardcoat layer comprises silicon oxynitride and the overcoat layer comprises diamond-like carbon.

9. The wear-resistant window of claim 8, wherein the hardcoat layer is about 50,000 Angstroms thick and the overcoat layer is about 200 Angstroms thick.

10. A wear-resistant optical device, comprising:

a transparent substrate;

a hardcoat layer on the transparent substrate and comprising a fluorine-doped region of a first thickness and a non-fluorine doped region of a second thickness, wherein the second thickness is greater than the first thickness; and a carbon-containing overcoat layer on the hardcoat layer and adjacent to the fluorine-doped region;

wherein the hardcoat layer has a thickness of about 40,000–60,000 Angstroms, with the fluorine-doped region thereof having a thickness of about 1000–2500 Angstroms, the hardcoat layer and the overcoat layer providing high transparency for visible radiation, hardness, low friction and lubricity to the optical device.

11. The optical device of claim 10, wherein the transparent substrate is glass or silica.

12. The optical device of claim 10, wherein the hardcoat layer comprises a material selected from the group consisting of silicon oxide, silicon nitride, silicon oxynitride, and combinations thereof.

13. The optical device of claim 10, wherein the hardcoat layer comprises a non-fluorine-doped silicon oxynitride layer formed on the substrate and a fluorine-doped silicon oxynitride layer formed in a surface region underneath the overcoat layer.

14. The optical device of claim 10, wherein the overcoat layer comprises a material selected from the group consisting of hard carbon, hydrogenated carbon, diamond-like carbon, and combinations thereof.

15. The optical device of claim 10, wherein the overcoat layer has a thickness of about 100–300 Angstroms.

16. A wear-resistant optical device, comprising:

a transparent substrate;

a hardcoat layer on the transparent substrate and comprising a non-fluorine-doped silicon oxynitride layer on the substrate, and a fluorine-doped silicon oxynitride layer on the non-fluorine-doped silicon oxynitride layer; and a diamond-like carbon overcoat layer on the fluorine-doped silicon oxynitride layer, wherein the hardcoat layer has a thickness of about 40,000–60,000 Angstroms, with the fluorine-doped silicon oxynitride layer thereof having a thickness of about 1000–2500 Angstroms, the hardcoat layer and the overcoat layer providing high transparency for visible radiation, hardness, low friction and lubricity to the optical device.

* * * * *